United States Patent

Miyake

[11] Patent Number: 5,934,768
[45] Date of Patent: Aug. 10, 1999

[54] BRAKE CONTROL APPARATUS

[75] Inventor: Katsuya Miyake, Saitama, Japan

[73] Assignee: Akebono Industry Co., Ltd., Tokyo, Japan

[21] Appl. No.: 08/810,223

[22] Filed: Feb. 28, 1997

[30] Foreign Application Priority Data

Mar. 1, 1996 [JP] Japan ................................ 8-044539

[51] Int. Cl.$^6$ ............................................. B60T 8/88
[52] U.S. Cl. .............................. 303/122.09; 303/DIG. 7
[58] Field of Search ..................... 303/122.09, DIG. 7, 303/186, 187, 188; 701/70, 39

[56] References Cited

U.S. PATENT DOCUMENTS

| 4,110,732 | 8/1978 | Jarocha et al. | 303/DIG. 7 |
| 5,292,184 | 3/1994 | Takata | 303/DIG. 7 |
| 5,696,681 | 12/1997 | Hrovat et al. | 303/DIG. 7 |

FOREIGN PATENT DOCUMENTS 4-262907  9/1992  Japan.

*Primary Examiner*—Robert J Oberleitner
*Assistant Examiner*—Melanie Talavera
*Attorney, Agent, or Firm*—Morgan, Lewis & Bockius LLP

[57] ABSTRACT

A brake control apparatus has a control unit 30 for controlling a brake mechanism 40 for braking each of the wheels provided for a vehicle, and a tire abnormality detection device 10 for detecting abnormal air pressure of a tire attached to each of the wheels and transmitting a signal to the control unit 30. When the control unit 30 determines that the air pressure of any one of the tires has become lower than a predetermined level, the control unit 30 controls the brake mechanism 40 to brake a tire opposite to the low-pressure tire to the right or left. As a consequence, safety is improved even if a tire has been punctured during operation of a vehicle.

18 Claims, 10 Drawing Sheets

DIFFERENCE BETWEEN RIGHT WHEEL (A - B) AND LEFT WHEEL

YAW RATE

BRAKE CONTROL APPARATUS

BACKGROUND OF THE INVENTION

1. Field of the Invention

The present invention relates to a brake control apparatus for controlling a brake mechanism of a vehicle and, more particularly, to a brake control apparatus that improves safety when a tire is punctured or the pressure thereof is reduced rapidly.

2. Discussion of the Related Art

It is important to improve safety during operation of a vehicle. A tire deflation detection method was disclosed in Japanese Patent Laid-Open No. 4-262907. In this document, puncture of a tire is detected and the driver is notified of such puncture by an alarm.

In the above disclosure, a technique was described in which angular-velocity signals supplied from wheel speed sensors attached to the respective wheels are subjected to a comparison. That is, the radii of gyration of the tires attached to the wheels are compared with one another. This allows a detection of the reduction in the pressure and also a display of the state of reduction of the tire pressure for the purpose of notifying the driver.

The above-mentioned system for detecting the pressure reduction of the tire for issuing an alarm to a driver is effective when the driver of the vehicle does not realize the pressure reduction (puncture) in the tire, and the pressure in the tire is reduced relatively moderately.

However, if the tire bursts or the pressure is reduced rapidly, the steering wheel will be instantaneously and uncontrollably turned in the direction of the punctured tire. Therefore, the alarm indicating the puncture of the tire is insufficient to prevent an accident due to delays in the operation of the steering wheel and the brake unit. The above-mentioned rapid change or turning of the steering wheel is especially apparent when either one of the front wheels has been punctured.

SUMMARY OF THE INVENTION

Accordingly, the present invention is directed to a brake control apparatus that substantially obviates one or more of the problems due to limitations and disadvantages of the related art.

An object of the present invention is to improve safety when a tire is punctured during operation of a vehicle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and, in accordance with the purpose of the present invention, as embodied and broadly described, the brake control apparatus includes a control unit for controlling a brake mechanism for braking each of a plurality of wheels provided for a vehicle; and a tire abnormality detection unit for detecting abnormal air pressure of a tire attached to each of the wheels and for transmitting a signal to the control unit, wherein, when the control unit determines from the signal that the air pressure of any one of the tires has become lower than a predetermined level, the control unit controls the brake mechanism to brake the wheel of attire opposite to that low-pressure one.

It should be noted that the control unit may control the brake mechanism to apply a predetermined braking force to the wheels of tires, the air pressure of each of which is larger than the predetermined level, when the control unit has determined that the air pressure of any one of the tires has become lower than the predetermined level.

In another aspect, the brake control apparatus is configured such that the tire abnormality detection unit includes a speed sensor for detecting speed of each wheel and a steering-angle sensor for detecting a steering angle of the vehicle; and the control unit obtains a difference in speed between a right wheel and a left wheel in response to a signal supplied from the speed sensor and determines that air pressure of any one of the tires has become lower than a predetermined level when the difference in the speed at a detected steering angle is larger than a predetermined value.

In yet another aspect, the brake control apparatus is configured such that the tire abnormality detection unit includes an air-pressure sensor for measuring air pressure of each of the tires; and the control unit determines that air pressure of a tire has become lower than a predetermined level in response to a signal supplied from the air-pressure sensor.

In still another aspect, the brake control apparatus is configured such that the tire abnormality detection unit includes a yaw-rate sensor for detecting a yaw rate of the vehicle and a steering-angle sensor for detecting a steering angle of the vehicle; and the control unit determines that air pressure of any one of the tires has become lower than a predetermined level when the yaw rate at the detected steering angle is higher than a predetermined value.

In a further aspect, the brake control apparatus is configured such that the tire abnormality detection unit includes a lateral-acceleration sensor for detecting a lateral acceleration of the vehicle and a steering-angle sensor for detecting a steering angle of the vehicle; and the control unit determines that an air pressure of any one of the tires has become lower than a predetermined level when the lateral acceleration at the detected steering angle is larger than a predetermined value.

A brake mechanism of the present invention is exemplified by a disc brake and a drum brake arranged to be operated with fluid pressure (liquid pressure or air pressure) supplied to a wheel cylinder. The brake mechanism may have a structure including a valve mechanism, such as an electromagnetic valve, for controlling the fluid pressure.

It is preferable that the control unit of the present invention includes a central processing unit (CPU), a random access memory (RAM), a read only memory (ROM), an input/output unit (I/O), and a bus for connecting these units.

A tire abnormality detection unit in accordance with the present invention detects reduction of the internal pressure of a tire. This unit may incorporate any one of the following sensors or be formed by combining a variety of such sensors: a speed sensor, a steering-angle sensor, an air-pressure sensor, a yaw-rate sensor, and a lateral-acceleration sensor.

The speed sensor may include an electromagnetic pickup type speed sensor.

The steering-angle sensor may include a sensor for detecting the operation angle (the amount of rotation from a reference point) of the steering wheel.

The yaw-rate sensor may be structured to detect the ratio of change in the yaw angle as the time elapses during operation of the vehicle. For example, a gyrosensor may be employed to form the yaw-rate sensor.

The air-pressure sensor may be structured to directly measure the internal pressure of the tire. The air-pressure sensor can be realized by integrally providing a pressure sensor for measuring the internal pressure of the tire with the wheel and by providing, for the body of the vehicle, a receiver for receiving a wireless signal transmitted from the pressure sensor.

The lateral acceleration sensor may include a known lateral acceleration sensor.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DETAILED DESCRIPTION OF PREFERRED EMBODIMENTS

Reference will now be made in detail to preferred embodiments of the present invention, examples of which are illustrated in the accompanying FIGS. 1 to 11.
<Embodiment 1>

Figure 11:
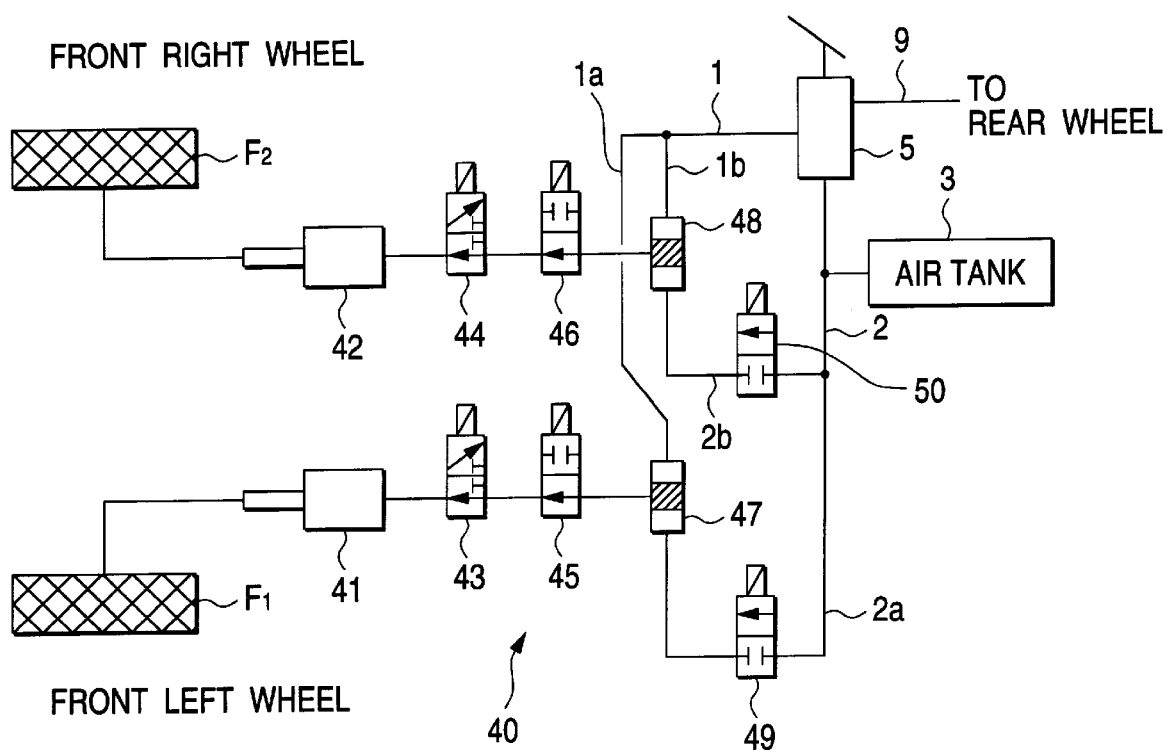
FIG. 11 is a diagram showing a brake system in accordance with the present invention.

A brake control apparatus according to a first embodiment of the present invention includes a brake mechanism 40 (a brake system) configured as depicted in FIG. 11. In this embodiment, an air tank 3 serving as a pressure source communicates with a brake valve 5 arranged to be opened and closed when a driver operates a brake pedal. The brake valve 5 is connected to a first front-wheel pipe line 1 communicating with each wheel cylinder (not shown) of the front wheel and to a rear wheel pipe line 9 communicating with each wheel cylinder of the rear wheel.

The first front-wheel pipe line 1 has a first left-wheel-side pipe line 1a communicating with the wheel cylinder of a front left wheel F1 and a first right-wheel-side pipe line 1b communicating with the wheel cylinder of a front right wheel F2. An air booster 41 for converting air pressure supplied from the air tank 3 into fluid pressure and supplying it to the wheel cylinder is inserted into the first left-wheel-side-pipe line 1a. A decay valve 43 and a hold valve 45, which are electromagnetic valves for adjusting the brake-pressure in the wheel cylinder, are interposed in front of the air booster 41 in the first left-wheel-side pipe line 1a.

The first left-wheel-side pipe line 1a is, at a position in front of the hold valve 45, connected to a second front-wheel pipe line 2 communicating with the air tank 3 but not the brake valve 5. A left-wheel electromagnetic valve 49 is interposed at an intermediate position of the second front-wheel pipe line 2.

A two-way valve 47 for selecting air flow supplied from either of two directions in order to supply selected air to the wheel cylinder, is disposed in a connected portion between the first left-wheel-side pipe line (the first front-wheel pipe line 1) 1a and the second front-wheel pipe line 2. That is, the two-way valve 47 supplies, toward the wheel cylinder, whichever of air supplied from the air tank 3 through the brake valve 5 or air supplied from the air tank 3 through the left-wheel electromagnetic valve 49, has a higher pressure.

Similarly, the first right-wheel-side pipe line 1b is provided with an air booster 42, a decay valve 44, a hold valve 46, and a two-way valve 48. The two-way valve 48 is connected to the second front-wheel pipe line 2 communicating with the air tank 3 but not the brake valve 5. A right-wheel electromagnetic valve 50 is interposed at an intermediate position of the second front-wheel pipe line 2.

The second front-wheel pipe line 2 branches into a section formed toward the two-way valve 47 and a section formed towards the two-way valve 48. The pipe line having the two-way valve 47 interposed thereon is a second left-wheel-side pipe line 2a, while the pipe line having the two-way valve 48 interposed thereon is a second left-wheel-side pipe line 2b.

The decay valves 43 and 44, the hold valves 45 and 46, the left-wheel electromagnetic valve 49 and the right-wheel electromagnetic valve 50, are electrically connected to a control unit (ECU) 30 so as to arbitrarily be operated in response to corresponding instruction signals supplied from the control unit 30.

Figure 1:
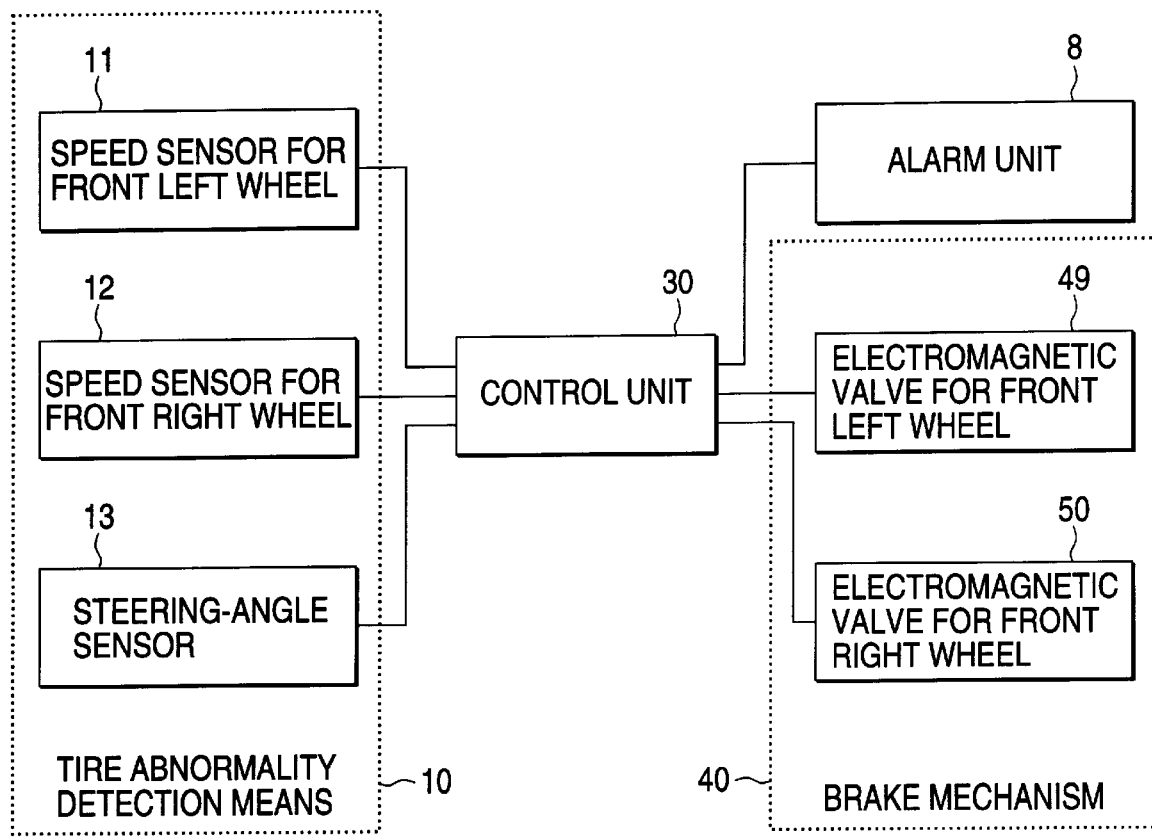
FIG. 1 is a block diagram of a structural view showing a brake control apparatus according to a first embodiment of the present invention.

As shown in FIG. 1, a tire abnormality detection unit 10 for detecting reduction of the air pressure in the tire is connected to the control unit 30. The tire abnormality detection unit 10 is composed of a front-left-wheel speed sensor 11 for detecting the rotational angular velocity of the front left wheel, a front-right-wheel speed sensor 12 for detecting the rotational angular velocity of the front right wheel, and a steering-angle sensor 13 for detecting the steering angle of the steering wheel.

The control unit 30 is also connected to an alarm unit 8 for issuing an alarm to a driver when either of the left-wheel electromagnetic valve 49 or the right-wheel electromagnetic valve 50 is operated. The alarm unit 8 simultaneously performs a visual display using a lamp or the like and an announcement by using a buzzer sound or the like.

Operation of the first embodiment will now be described. The usual braking operation which occurs during operation of the vehicle will be described first.

When the brake valve 5 has been opened due to application of the operator's foot to the brake pedal, air supplied from the air tank 3 is allowed to pass through the first front-wheel pipe line 1, and then allowed to pass through the first left-wheel-side pipe line 1a, the first right-wheel-side pipe line 1b, the two-way valves 47 and 48, the hold valves 45 and 46, and the decay valves 43 and 44, to reach the air boosters 41 and 42. Then, the air pressure is converted into fluid pressure by the air boosters 41 and 42 so that braking pressure is supplied to the wheel cylinder of the front left wheel F1 and to the wheel cylinder of the front right wheel F2. Thus, the wheels are braked.

At this time, if the control unit 30 determines the possibility of locking of the front left wheel F1 in response to a signal supplied from each of the wheel speed sensors, the control unit 30 adequately controls the hold valve 45 and the decay valve 43 to prevent locking of the front left wheel F1.

That is, to reduce the braking pressure in the wheel cylinder of the front left wheel F1, the wheel cylinder 45 is closed and the decay valve 43 is opened to discharge air in the wheel cylinder portion. To maintain the braking pressure in the wheel cylinder, both the hold valve 45 and the decay valve 53 are closed. To re-apply pressure to the brake in the wheel cylinder, the hold valve 45 is opened and the decay valve 43 is closed. Locking of the front right wheel F2 is prevented by performing control similar to that performed for the front left wheel F1.

Figure 5:
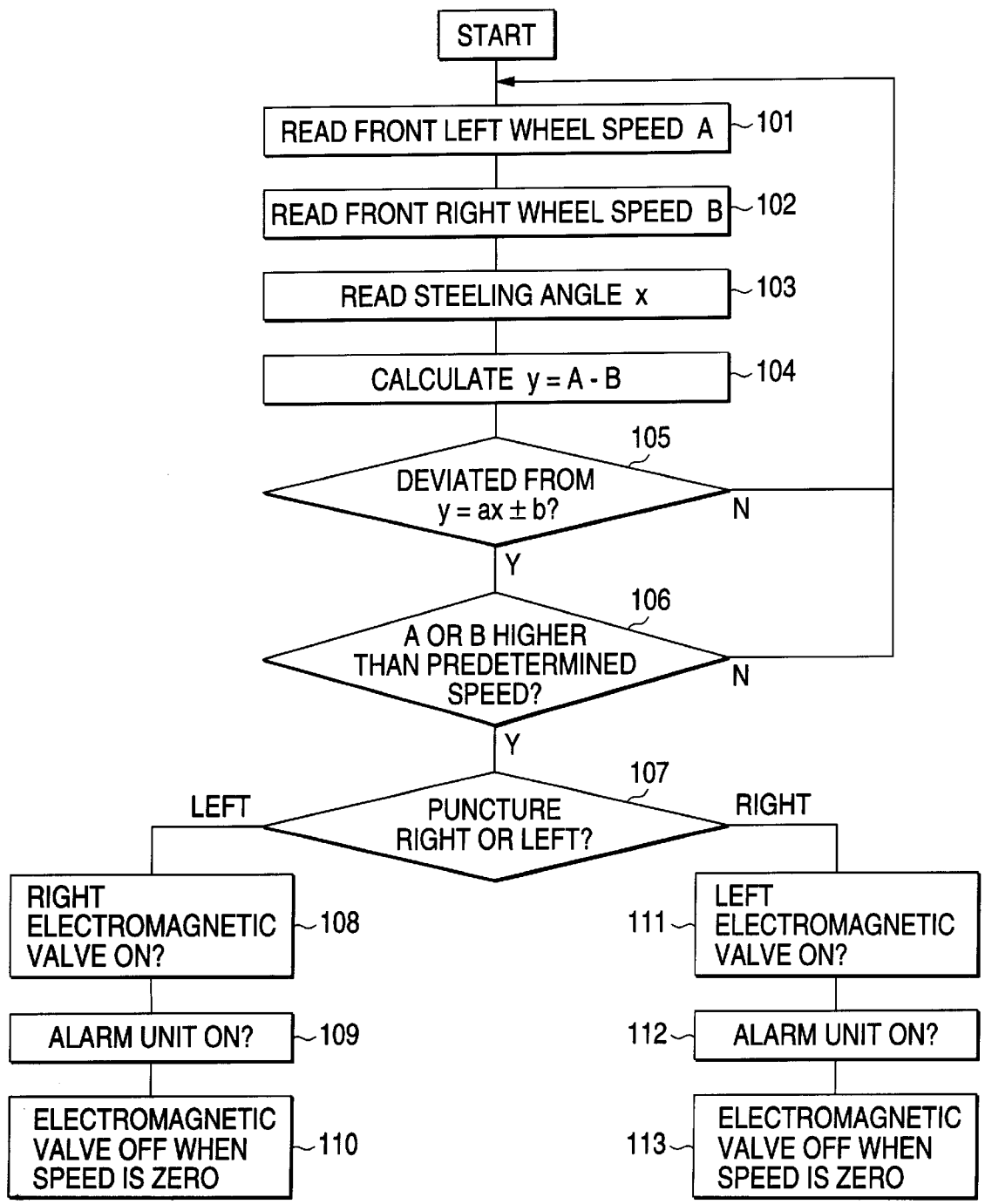
FIG. 5 is a block diagram of a flow chart of a control unit according to the first embodiment of the present invention.

The operation to be performed when the air pressure has been rapidly reduced because any one of the tires punctures during operation of the vehicle will now be described, with reference mainly to the flow chart of the control unit 30 shown in FIG. 5.

Initially, speed A of the front left wheel F1, which is included in information supplied from the front-left-wheel speed sensor 11, is read in step 101. In step 102, speed B of the front right wheel F2, which is included in information supplied from the front-right-wheel speed sensor 12 is read. In step 103, steering angle x, which is included in information supplied from the steering-angle sensor 13 is read. The sequential order of steps 101 to 103 is not limited to that described above and shown in FIG. 5.

Next, a speed difference between the front right wheel and the front left wheel is calculated in step 104. In step 105, it is determined whether the speed difference y between the front right wheel and the front left wheel at the steering angle x is larger than a predetermined threshold value.

Figure 8:
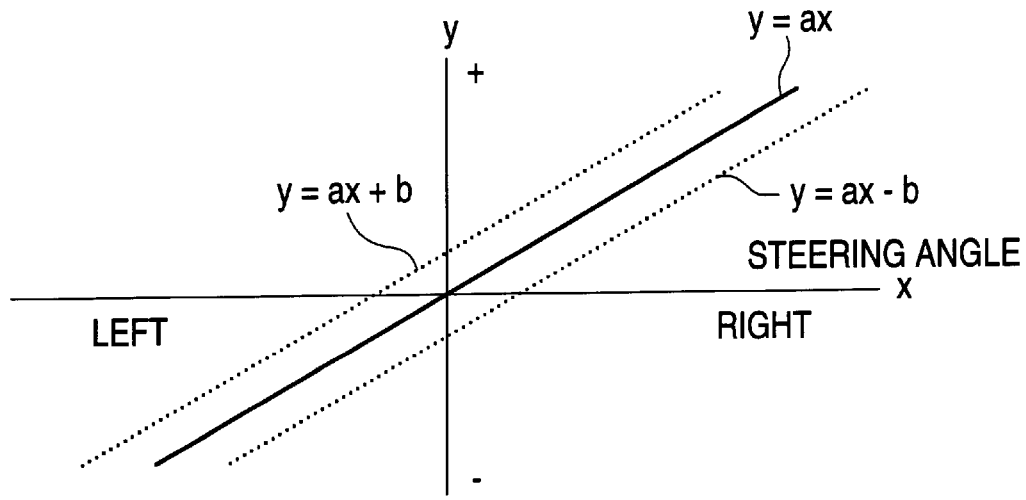
FIG. 8 is graph showing the relationship between steering angles and differences between the right wheel and the left wheel according to the first embodiment of the present invention.

The threshold value of the speed difference y at the steering angle x will now be described with reference to FIG. 8. Assuming that the x-axis represents steering angles and the y-axis represents the speed differences between the front right wheel and the front left wheel, when the speed difference y is larger than (ax+b) [where a is a constant], the tire of the front right wheel F2 has been punctured and, thus, the air pressure has become lower than a predetermined level because the speed of the front right wheel F2 has been lowered abnormally with respect to the steering angle. When the speed difference y is smaller than (ax−b), the tire of the front left wheel F1 has been punctured and, thus, the air pressure has become lower than the predetermined value because the speed of the front left wheel F1 has been lowered abnormally with respect to the steering angle.

If deviation from (y=ax±b) takes place in step 105, then a determination is made in step 106 as to whether the speed of either of the front right wheel or the front left wheel is higher than a predetermined speed. The reason for this is that the steering wheel is not forcibly when the vehicle is running at low speed, even if the tire is punctured. It should be noted that the negative branch of step 105 and that of step 106 are a circulation routine of step 101. That is, these negative branches return the flowchart back to step 101.

The affirmative branch of step 106 results in step 107, where a determination is made as to whether the punctured wheel is the front left wheel F1 or the front right wheel F2. In this case, the wheel having a low wheel speed is determined to be punctured.

When the tire of the front left wheel F1 has been punctured, the right-wheel electromagnetic valve 50 is operated (opened) so that air supplied from the air tank 3 is supplied to the wheel cylinder through the second front-wheel pipe line 2 and the two-way valve 48. This forcibly brakes the front right wheel F2 (step 108). Simultaneously with the aforementioned braking operation, the alarm unit 8 is operated to alert the driver that the tire has punctured and braking has automatically been performed (step 109). When the vehicle has been stopped, the right-wheel electromagnetic valve 50 is closed (step 110).

On the other hand, if it is determined in step 107 that the tire of the front right wheel F2 has been punctured, the left-wheel electromagnetic valve 49 is operated (opened) so that air supplied from the air tank 3 is allowed to pass through the second front-wheel pipe line 2 and the two-way valve 47 to be supplied toward the wheel cylinder to forcibly brake the front left wheel F1 (step 111). Simultaneously with the aforementioned braking operation, the alarm unit 8 is operated to alert the driver that the tire has been punctured and braking has automatically been performed (step 112). When the vehicle has stopped, the left-wheel electromagnetic valve 49 is closed (step 113).

<Embodiment 2>

The second embodiment of the present invention will now be described.

Figure 2:
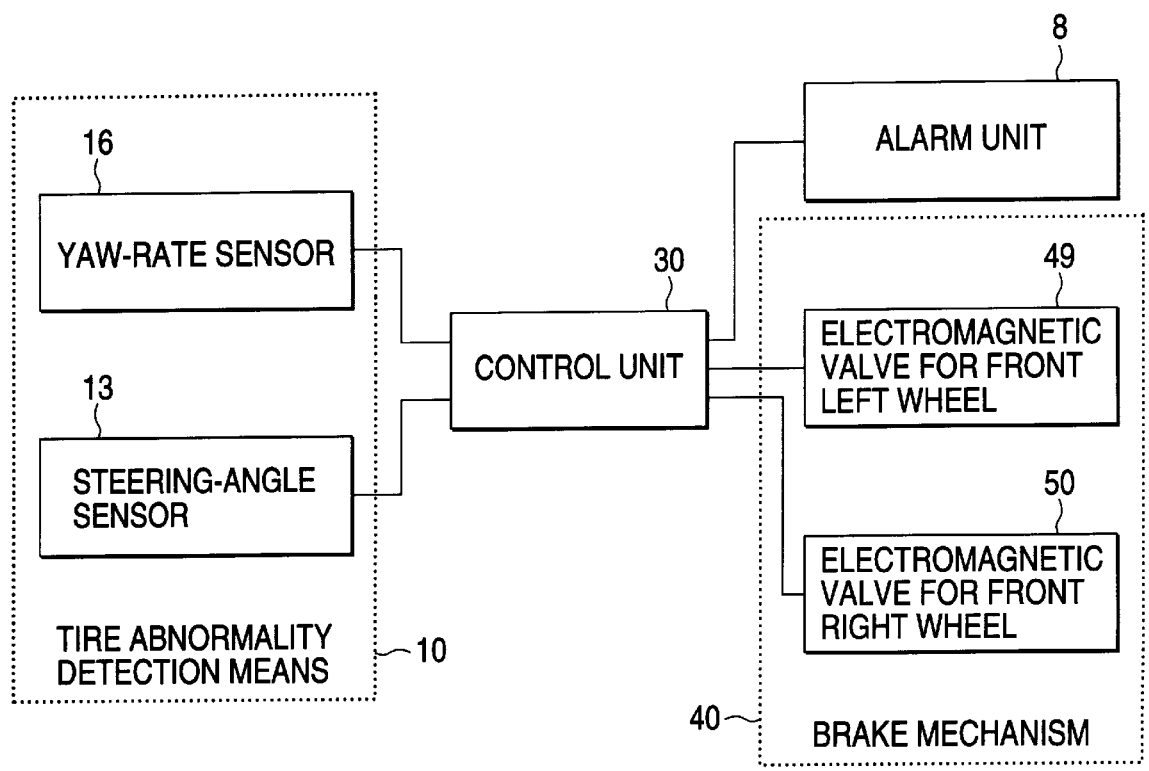
FIG. 2 is a block diagram of a structural view showing a brake control apparatus according to a second embodiment of the present invention.

This embodiment has a structure such that a yaw-rate sensor 16 and a steering-angle sensor 13 are provided as the tire abnormality detection unit 10, as shown in FIG. 2. The yaw-rate sensor 16 comprises a gyrosensor for detecting the ratio of change in the yaw angle as time elapses so as to transmit a signal to the control unit 30. Since the other structures are the same as those of the first embodiment described above, such same structures are omitted from the description here of the second embodiment.

Figure 6:
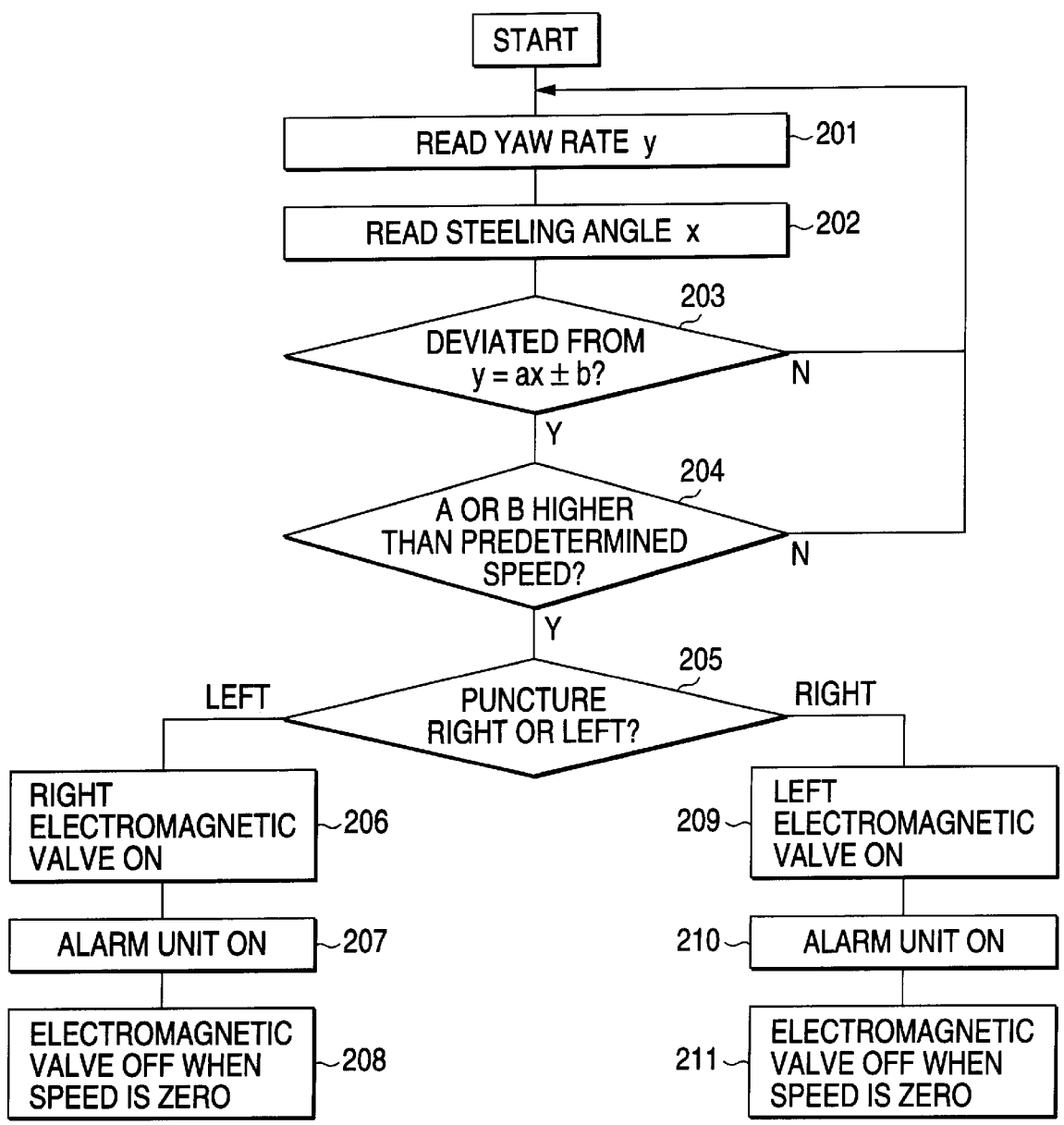
FIG. 6 is a flow chart of a control unit according to the second embodiment of the present invention.

The operation of this embodiment will now be described mainly with reference to a flow chart of the control unit 30 shown in FIG. 6

In step 201, yaw rate y included in information supplied from the yaw-rate sensor 16 is read. In step 202, steering angle x included in information supplied from the steering-angle sensor 13 is read. The sequential order of step 201 and step 202 is not limited to that described above and shown in FIG. 6.

In step 203, it is determined whether the yaw rate y at the steering angle x is larger than a predetermined threshold value.

Figure 9:
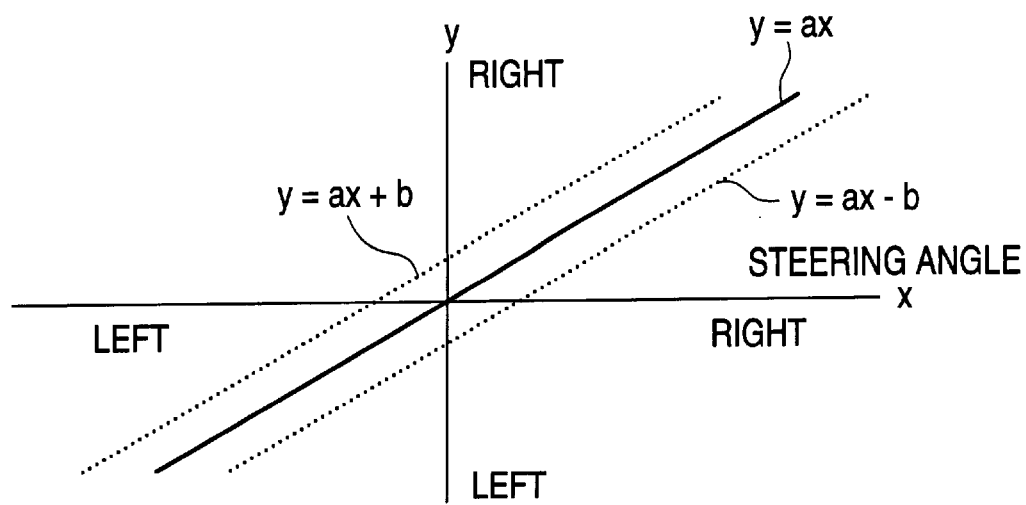
FIG. 9 is graph showing the relationship between steering angles and yaw rates according to the second embodiment of the present invention.

The threshold value of the yaw rate y at the steering angle x will now be described with reference to FIG. 9. Assuming that the x-axis represents the steering angles and the y-axis represents the yaw rates, when the yaw rate y is larger than (ax+b) [where a is a constant], the tire of the front right wheel F2 has been punctured and, thus, the air pressure has become lower than a predetermined level because the rightward yaw rate has become abnormally large (the leftward yaw rate has become abnormally small with respect to the steering angle) with respect to the steering angle. A case where the yaw rate y is smaller than (ax−b), means that the tire of the front left wheel F1 has been punctured and, thus, the air pressure has become lower than the predetermined value because the leftward yaw rate has become abnormally large (the rightward yaw rate has become abnormally small with respect to the steering angle) with respect to the steering angle.

If deviation from (y=ax±b) takes place in step 203, it is determined whether the speed of either of the front right wheel or the front left wheel is higher than a predetermined speed (step 204). It should be noted that the negative branch of step 203 and that of step 304 are a circulation routine of step 201. That is, these negative branches return the flow-chart back to step 201.

The affirmative branch of step 204 results in step 205 where a determination is performed as to whether the punctured wheel is the front left wheel F1 or the front right wheel F2. In this case, the wheel having a low wheel speed is determined to be punctured.

In a case where the tire of the front left wheel F1 has been punctured, the right-wheel electromagnetic valve 50 is operated (opened) so that air supplied from the air tank 3 is supplied toward the wheel cylinder through the second front-wheel pipe line 2 and the two-way valve 48. This forcibly brakes the front right wheel F2 (step 206). Simultaneously with the aforementioned braking operation, the alarm unit 8 is operated to alert the driver that the tire has been punctured and braking has automatically been performed (step 207). When the vehicle has stopped, the right-wheel electromagnetic valve 50 is closed (step 208).

On the other hand, if it is determined in step 205 that the tire of the front right wheel F2 has been punctured, the left-wheel electromagnetic valve 49 is operated (opened) so that air supplied from the air tank 3 is allowed to pass through the second front-wheel pipe line 2 and the two-way valve 47 to be supplied toward the wheel cylinder to forcibly brake the front left wheel F1 (step 209). Simultaneously with the aforementioned braking operation, the alarm unit 8 is operated to alert the driver to that the tire has been punctured and braking has automatically been performed (step 210). When the vehicle has stopped, the left-wheel electromagnetic valve 49 is closed (step 211).

<Embodiment 3>

The third embodiment of the present invention will now be described.

Figure 3:
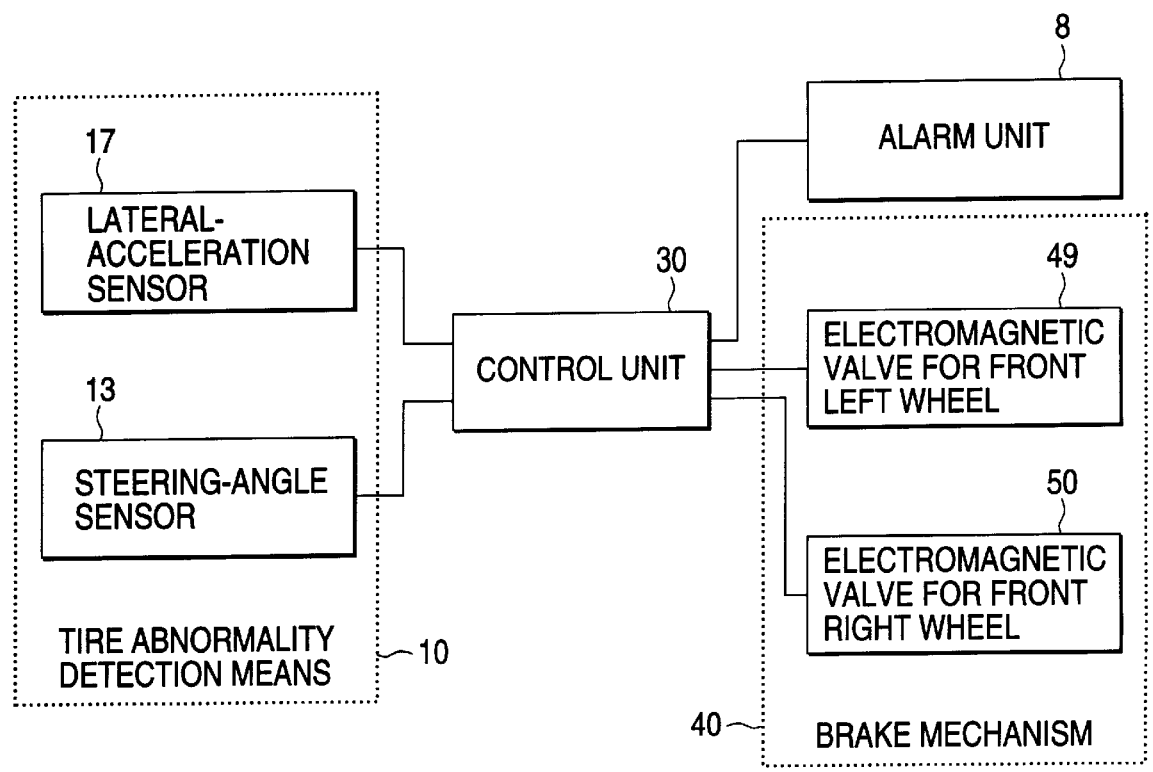
FIG. 3 is a block diagram of a structural view showing a brake control apparatus according to a third embodiment of the present invention.

This embodiment has a structure such that a lateral-acceleration sensor 17 and a steering-angle sensor 13 are provided as the tire abnormality detection unit 10, as shown in FIG. 3. The lateral-acceleration sensor 17 comprises an acceleration sensor having a piezoelectric-device to detect the acceleration value in the right and left direction with respect to the vehicle body so as to transmit a signal to the control unit 30. Since the other structures are the same as those of the first embodiment described above, such same structures are omitted from the description here of the third embodiment.

Figure 7:
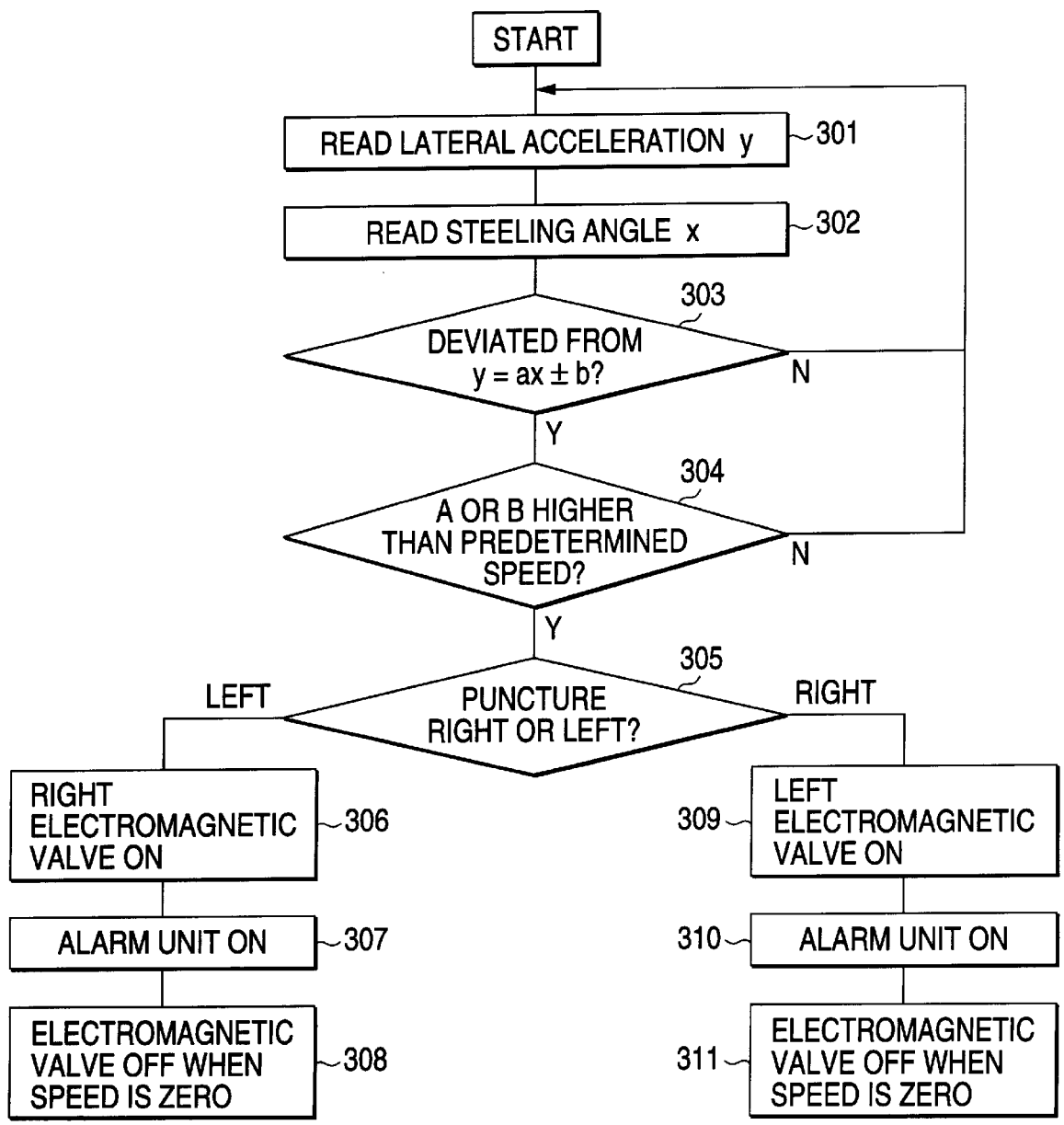
FIG. 7,is a flow chart of a control unit according to the third embodiment of the present invention.

The operation of this embodiment will now be described mainly with reference to a flow chart of the control unit 30 shown in FIG. 7.

In step 301, the lateral acceleration y, which is included in information supplied from the lateral-acceleration sensor 17 is read. In step 302, steering angle x, which is included in information supplied from the steering-angle sensor 13 is read. The sequential order of step 301 and step 302 is not limited to that described above and shown in FIG. 7.

In step 303, it is determined whether the lateral acceleration y at the steering angle x is larger than a predetermined threshold value.

Figure 10:
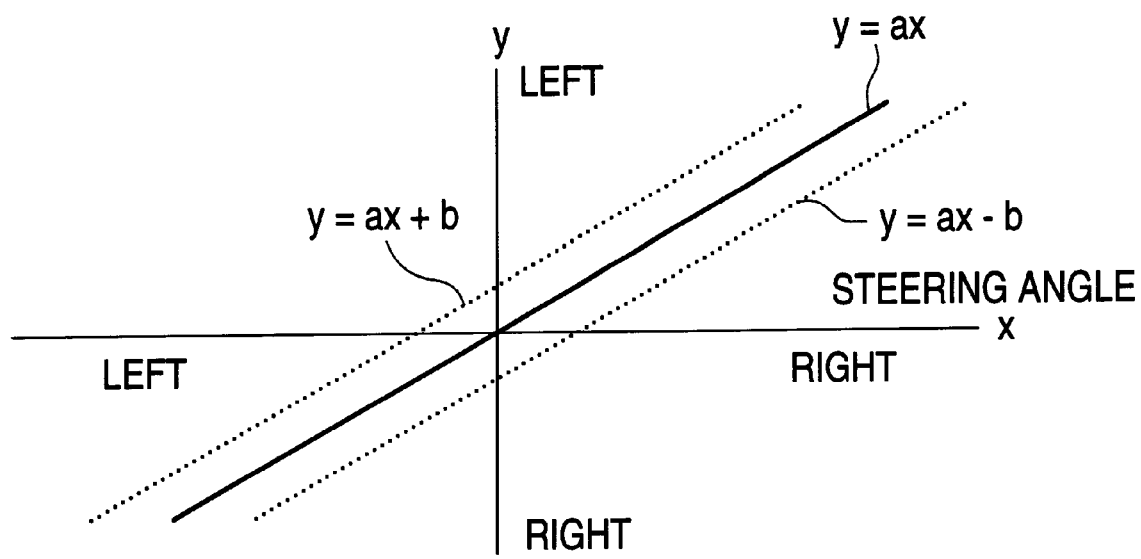
FIG. 10 is graph showing the relationship between steering angles and lateral accelerations according to the third embodiment of the present invention.

The threshold value of the lateral acceleration y at the steering angle x will now be described with reference to FIG. 10. Assuming that the x-axis represents the steering angles and the y-axis represents lateral accelerations, when the lateral acceleration y is larger than (ax+b) [where a is a constant], the tire of the front left wheel F1 has been punctured and, thus, the air pressure has become lower than a predetermined level because the leftward lateral acceleration has become abnormally large (the rightward acceleration has become abnormally small with-respect to the steering angle) with respect to the steering angle. When the lateral acceleration y is smaller than (ax−b), the tire of the front right wheel F2 has been punctured and, thus, the air pressure has become lower than the predetermined value because the rightward lateral acceleration has become abnormally large (the leftward yaw rate has become abnormally small with respect to the steering angle) with respect to the steering angle.

If deviation from (y=ax±b) takes place in step 303, it is determined whether the speed of either of the front right wheel or the front left wheel is higher than a predetermined speed (step 304). It should be noted that the negative branch of step 303 and that of step 304 are a circulation routine of step 301. That is, these negative branches return the flow-chart back to step 301.

The affirmative branch of step 304 results in step 305 where a determination is performed as to whether the punctured wheel is the front left wheel F1 or the front right wheel F2. The wheel having a low wheel speed is determined to be punctured.

When the tire of the front left wheel F1 has been punctured, the right-wheel electromagnetic valve 50 is operated (opened) so that air supplied from the air tank 3 is supplied toward the wheel cylinder through the second front-wheel pipe line 2 and the two-way valve 48. This forcibly brakes the front right wheel F2 (step 306). Simultaneously with the aforementioned braking operation, the alarm unit 8 is operated to alert the driver that the tire has been punctured and braking has automatically been performed (step 307). When the vehicle has stopped, the right-wheel electromagnetic valve 50 is closed (step 308).

On the other hand, if it is determined in step 305 that the tire of the front right wheel F2 has been punctured, the left-wheel electromagnetic valve 49 is operated (opened) so that air supplied from the air tank 3 is allowed to pass through the second front-wheel pipe line 2 and the two-way valve 47 to be supplied toward the wheel cylinder to forcibly brake the front left wheel F1 (step 309). Simultaneously with the aforementioned braking operation, the alarm unit 8 is operated to a lot the driver that the tire has been punctured and braking has automatically been performed (step 310). When the vehicle has stopped, the left-wheel electromagnetic valve 49 is closed (step 311).

<Embodiment 4>

The fourth embodiment of the present invention will now be described.

Figure 4:
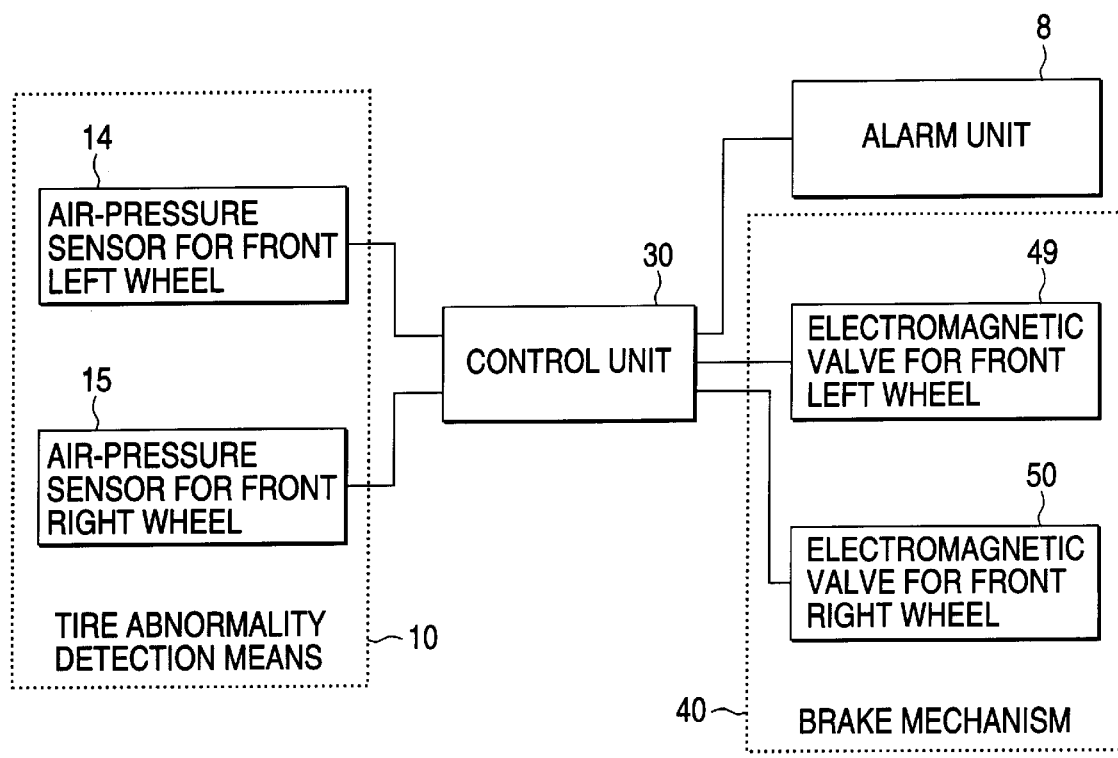
FIG. 4 is a block diagram of a structural view showing a brake control apparatus according to a fourth embodiment of the present invention.

This embodiment has a structure such that an air-pressure sensor for directly measuring the air pressure of the tire is employed as the tire abnormality detection unit 10, as shown in FIG. 4. The air-pressure sensor is composed of a left-wheel air-pressure sensor 14 for measuring the air pressure of the front left wheel and a right-wheel air-pressure sensor 15 for measuring the air pressure of the front right wheel.

Each of the left-wheel air-pressure sensor 14 and the right-wheel air-pressure sensor 15 has an air-pressure measuring device formed integrally with the wheel and a receiver arranged to receive a wireless signal transmitted from the air-pressure measuring device and provided for the car body. A signal transmitted from the receiver is arranged to be supplied to the control unit 30. Since the other structures are the same as those of the first embodiment described above, such same structures are omitted from the description here of the fourth embodiment.

The operation of this embodiment will now be described.

If the control unit 30 determines that the air pressure of the tire of any one of the wheels is lower than a predetermined level and the reduction ratio of the air pressure is higher than a predetermined value at this time in accordance with information supplied from the left-wheel air-pressure sensor 14 and the right-wheel air-pressure sensor 15, the control unit 30 controls the brake mechanism 40 to brake the wheel opposite to the tire, the pressure of which has been reduced, to the right or left.

That is, if the air pressure of the tire of the front left wheel F1 becomes lower than a predetermined level and the reduction ratio of the air pressure at this time is higher than a predetermined value, the control unit 30 operates the right-wheel electromagnetic valve 50 to brake the front right wheel F2, and operates the alarm unit 8. When the vehicle has stopped, forcible braking is suspended.

When the air pressure of the tire of the front right wheel F2 becomes lower than the predetermined level and the reduction ratio of the air pressure at this time is higher than the predetermined value, the control unit 30 operates the left-wheel electromagnetic valve 49 to brake the front left wheel F1, and operates the alarm unit 8. When the vehicle has stopped, forcible braking is suspended.

When only the air pressure of the tire becomes lower than the predetermined level, the air pressure has not been rapidly lowered and, therefore, the risk of the steering wheel being turned is not considerably high. In this case, braking is not performed; only the alarm unit 8 is operated.

As described above, when the tire of a running vehicle has been burst or punctured such that the air pressure is rapidly lowered, the structure of this embodiment causes the wheel opposite to the punctured tire to the right or left to be forcibly braked. Therefore, unintentional turning of the steering wheel held by the driver can satisfactorily be prevented. Thus, the vehicle can be stopped safely.

Although the control of the front wheel is performed in the above-mentioned embodiments, the present invention may, of course, be applied to a structure in which the rear wheel is braked if the rear wheel is punctured. Moreover, if the front wheel is punctured, the rear wheel may, as well as the front wheel, be forcibly braked.

When forcible brake control is performed, a predetermined braking force may be applied to the wheel of the tire which is not punctured in consideration of the residual air pressure of the punctured tire and the vehicle speed. That is, the braking force to be applied to another wheel is enlarged in proportion to the air pressure of the punctured tire.

As for the predetermined value which is the threshold value to determine the puncture of the tire, an individual value may be provided for each tire. As an alternative to this, it may be provided as the value of the relative pressure difference among tires. That is, if both of the right and left wheels are punctured, a structure may be employed in which the control unit is able to control the brake mechanism to brake the wheel of the tire having the higher air pressure.

Again, according to the present invention, safety can be improved when a tire has been punctured during operation of a vehicle. Moreover, the apparatus for improving safety when a tire has been punctured during run of a vehicle can be provided with a simple structure at a reduced cost.

It will be apparent to those skilled in the art that various modifications and variations can be made in the brake control apparatus of the present invention without departing from the spirit or scope of the invention. Thus, it is intended that the present invention cover the modifications and variations of this invention provided they come within the scope of the appended claims and their equivalents.

What is claimed is:

1. A brake control apparatus comprising:

a control unit for controlling a brake mechanism for braking a plurality of wheels provided for a vehicle; and a tire abnormality detection unit for detecting abnormal air pressure of a tire attached to each of the wheels and for transmitting a signal to the control unit, wherein, in response to the control unit determining that air pressure of any one of the tires has become lower than a predetermined level, the control unit always signals the brake mechanism to brake the wheel of a tire opposite that one until said vehicle is stopped.

2. A brake control apparatus according to claim 1, wherein:

the tire abnormality detection unit comprises speed sensors for detecting a speed of each of the wheels and a steering-angle sensor for detecting a steering angle of the vehicle; and the control unit obtains a difference in speed between a right wheel and a left wheel in response to a signal supplied from the speed sensors and determines that air pressure of any one of the tires has become lower than the predetermined level when the difference in speed at a detected steering angle is larger than a predetermined value.

3. A brake control apparatus according to claim 2, wherein the speed sensors comprise an electromagnetic pickup speed sensor.

4. A brake control apparatus according to claim 1, wherein:

the tire abnormality detection unit comprises an air-pressure sensor for measuring air pressure of each of the tires; and the control unit determines that air pressure of any one of the tires has become lower than the predetermined level in response to the air-pressure sensor.

5. A brake control apparatus according to claim 1, wherein:

the tire abnormality detection unit comprises a yaw-rate sensor for detecting a yaw rate of the vehicle and a steering-angle sensor for detecting a steering angle of the vehicle; and the control unit determines that air pressure of any one of the tires has become lower than the predetermined level when the yaw rate at the detected steering angle is higher than a predetermined value.

6. A brake control apparatus according to claim 5, wherein the yaw-rate sensor comprises a gyrosensor.

7. A brake control apparatus according to claim 1, wherein:

the tire abnormality detection unit comprises a lateral-acceleration sensor for detecting a lateral acceleration of the vehicle and a steering-angle sensor for detecting a steering angle of the vehicle; and the control unit determines that an air pressure of any one of the tires has become lower than the predetermined level when the lateral acceleration at the detected steering angle is larger than a predetermined value.

8. A brake control apparatus according to claim 1, wherein the control unit brakes a right tire when the low-pressure tire is a left tire and brakes a left tire when the low-pressure tire is a right tire.

9. A brake control apparatus according to claim 1, wherein the control unit brakes a right front tire when the low-pressure tire is a left front tire and brakes a left front tire when the low-pressure tire is a right front tire.

10. A brake control apparatus according to claim 1, wherein the control unit brakes a right rear tire when the low-pressure tire is a left rear tire and brakes a left rear tire when the low-pressure tire is a right rear tire.

11. A brake control apparatus according to claim 1, wherein the tire abnormality detection unit comprises:

an air-pressure measuring device formed integrally with each of the wheels of the vehicle, the air-pressure measuring device transmitting a wireless signal relating to air pressure of a tire associated with the device; and a receiver device for receiving the wireless signal transmitted from the air-pressure measuring device and supplying information of the wireless signal to the control unit.

12. A brake apparatus according to claim 1, wherein the brake control apparatus comprises a structure to determine rapidity of occurrence of abnormal air pressure and to brake the opposite tire only when the detected air pressure has been rapidly lowered.

13. A brake control apparatus according to claim 1, wherein the detected abnormal air pressure corresponds to at least one of puncturing and bursting of a tire.

14. A brake control apparatus according to claim 1, further comprising an alarm for indicating to a driver that an abnormally low tire air pressure has been detected.

15. A brake control apparatus according to claim 14, wherein the alarm comprises an audio indicator.

16. A brake control apparatus according to claim 14, wherein the alarm comprises a visual indicator.

17. A method for automatically controlling braking in a vehicle having wheels, the method comprising the steps of:

detecting, by a tire abnormality detection unit of the vehicle, abnormal air pressure of a tire attached to each of the wheels; and in response to a determination by the detecting step that any one of the tires has an abnormal air pressure, always automatically controlling, by a control unit of the vehicle, a braking mechanism of the vehicle to automatically brake the wheel of a tire opposite the low-pressure one until said vehicle is stopped.

18. A method according to claim 17, wherein the controlling step comprises the step of determining that air pressure of any one of the tires has become lower than a predetermined level.

\* \* \* \* \*